US010517224B2

(12) United States Patent
Tori et al.

(10) Patent No.: US 10,517,224 B2
(45) Date of Patent: Dec. 31, 2019

(54) WREATH AND LANTERN HANGER

(71) Applicant: Forever Gifts, Inc., Arlington, TX (US)

(72) Inventors: Michael Tori, Dallas, TX (US); Marcus Pestl, Dallas, TX (US)

(73) Assignee: Forever Gifts, Inc., Arlington, TX (US)

( * ) Notice: Subject to any disclaimer, the term of this patent is extended or adjusted under 35 U.S.C. 154(b) by 0 days.

(21) Appl. No.: 15/816,883

(22) Filed: Nov. 17, 2017

(65) Prior Publication Data

US 2019/0150368 A1 May 23, 2019

(51) Int. Cl.
| | | |
|---|---|---|
| A01G 5/04 | (2006.01) |
| A47F 7/00 | (2006.01) |
| A47G 33/00 | (2006.01) |
| B42F 13/00 | (2006.01) |
| E06B 7/28 | (2006.01) |
| A47G 29/00 | (2006.01) |
| F21V 21/08 | (2006.01) |
| A47G 7/04 | (2006.01) |

(52) U.S. Cl.
CPC ............... *A01G 5/04* (2013.01); *A47G 7/045* (2013.01); *A47G 29/00* (2013.01); *F21V 21/08* (2013.01)

(58) Field of Classification Search
CPC ............ A01G 5/04; A47G 29/00; F21V 21/08
USPC ....... 248/339, 340, 301, 304, 307, 214, 215, 248/328, 225.21, 314; 211/13.1, 117, 211/118, 119
See application file for complete search history.

(56) References Cited

U.S. PATENT DOCUMENTS

| | | | |
|---|---|---|---|
| D70,831 S | * | 8/1926 | Dlouhy |
| 3,204,908 A | * | 9/1965 | Brown .................. A01K 97/00 248/228.6 |
| 5,607,131 A | | 3/1997 | Adams |
| 6,311,851 B1 | | 11/2001 | Knudsen, Sr. et al. |
| 6,857,608 B2 | | 2/2005 | Avinger |
| D568,727 S | * | 5/2008 | Walker .......................... D8/380 |
| 7,887,017 B2 | | 2/2011 | Moran |
| D702,540 S | | 4/2014 | Kacines |
| D708,932 S | * | 7/2014 | Fugett ............................ D8/381 |
| 8,905,573 B2 | | 12/2014 | Sharrah et al. |
| 9,736,992 B1 | * | 8/2017 | Barry ....................... A01G 5/04 |

OTHER PUBLICATIONS

"#3100 Adjustable Over the Door Wreath Hanger Candle Holder," Country Primitive Gatherings: Handmade Primitive Gifts, copyright 2010-2017, 2 pages, accessed Nov. 17, 2017. http://www.countryprimitivegatherings.com/store/WsDefault.asp?One=3100.

* cited by examiner

Primary Examiner — Tan Le
(74) Attorney, Agent, or Firm — Kirby Drake

(57) ABSTRACT

A hanging element or a combined wreath and lantern hanger hangs a wreath and a lantern or other decorative element on the same hanger. The hanger may be a unitary, solid, and one-piece component that may hang a first element central to a second element. The first element may be a lantern, and the second element may be a wreath. The hanging element or the combined wreath and lantern hanger may include an arm that may be arranged to stabilize the first element and second element that may be hanging from a surface. The surface may be an interior door, an exterior door, a wall, a gate, a fence, a pillar, a column, and a lamppost. The hanger or the arm may prevent the first element and the second element from damaging the surface.

18 Claims, 3 Drawing Sheets

WREATH AND LANTERN HANGER

TECHNICAL FIELD

The disclosure relates generally to hangers. In particular, the disclosure relates to an ornamental wreath and lantern hanger.

BACKGROUND

Separate wreath and lantern hangers can be used to decorate doors and walls. Other hangers can support more than one decorative object but typically remain static and easily damage surfaces behind the hanger and decorative object. Further, hangers available for decorating surfaces can cause users to have some difficulty positioning decorative objects in a straight or evenly placed manner.

SUMMARY

Embodiments of the present disclosure may provide a hanging device that may include a unitary, solid, one-piece hanger. The hanger may include a downward hook that may be provided to hang a first element. The downward hook may be connected to a curved leg, and the curved leg may be arranged to face or point outward. A seat may be provided to support a second element. The hanger may be arranged to position or hang the first element central to the second element. The first element may be a lantern, and the second element may be a wreath. The first element may be a lantern, and the second element may be any decorative object. The second element may be a wreath, and the first element may be any decorative object. An arm may be attached to a bottom portion of the hanger and may be fixed to the hanger. The arm may be adjustable to a plurality of positions that stabilize the first element and the second element on the hanger. The arm may prevent any of the hanger, the first element, and the second element from damaging the first surface behind the hanger, and the hanger may be hung from a portion of the first surface. The first surface may be selected from any of an interior door, an exterior door, a wall, a fence, a gate, a pillar, a column, and a lamppost. The hanging device may provide a flexible strip or a pad that may be attached to the arm, and the flexible strip or pad may be lined with a material that may stick or adhere to a second surface of the first or second element that may be suspended from the hanger. The hanging device may provide a flexible strip or a pad that may be attached to the arm, and the flexible strip or pad may be lined with a non-adhesive material that may grip the first surface. The hanging device may provide a flexible strip or a pad that may be attached to the arm, and the flexible strip or pad may be lined with a soft material.

Other embodiments of the present disclosure may provide a wreath and lantern hanger that may include a downward hook that may be provided to hang a first element. The wreath and lantern hanger may also include a seat that may be provided to support a second element. An adjustable arm may be attached to a bottom portion of the hanger and may stabilize the first element and the second element on the hanger. The hanger may be a unitary, solid, one-piece component. The hanger may position the first element central to the second element on the hanger. The downward hook may be connected to a curved leg, and the curved leg may be arranged to face or point outward. The first element may be a lantern, and the second element may be a wreath. The hanger may be made of a material that may provide a weather resistant finish. The hanger may provide an adjustable arm that may prevent the hanger, the first element, and the second element from damaging a first surface behind the hanger. The hanger may be hung from a portion of the first surface, and the first surface may be selected from any of an interior door, an exterior door, a wall, a gate, a fence, a pillar, a column, and a lamppost. The hanger may provide a flexible strip or pad that may be attached to the adjustable arm, and the flexible strip or pad may stick or adhere to a second surface of the first or second element that may be suspended from the hanger. The hanger may include a knob that may be attached to the adjustable arm and may be arranged to move the adjustable arm relative to the hanger and position the adjustable arm at different angles toward and away from the second surface of one or more of the elements suspended from the hanger. The knob may be a knurled screw knob that may tighten the adjustable arm onto the hanger and may fixedly anchor the adjustable arm in a desired position relative to the hanger.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides a wreath and lantern hanger that may be a unitary, solid, and one-piece component. In particular, the present disclosure relates to a lantern and wreath hanger that may provide an arm that may prevent the hanger, lantern, and/or wreath from damaging doors and walls and may hang the lantern central to the wreath.

Figure 1:
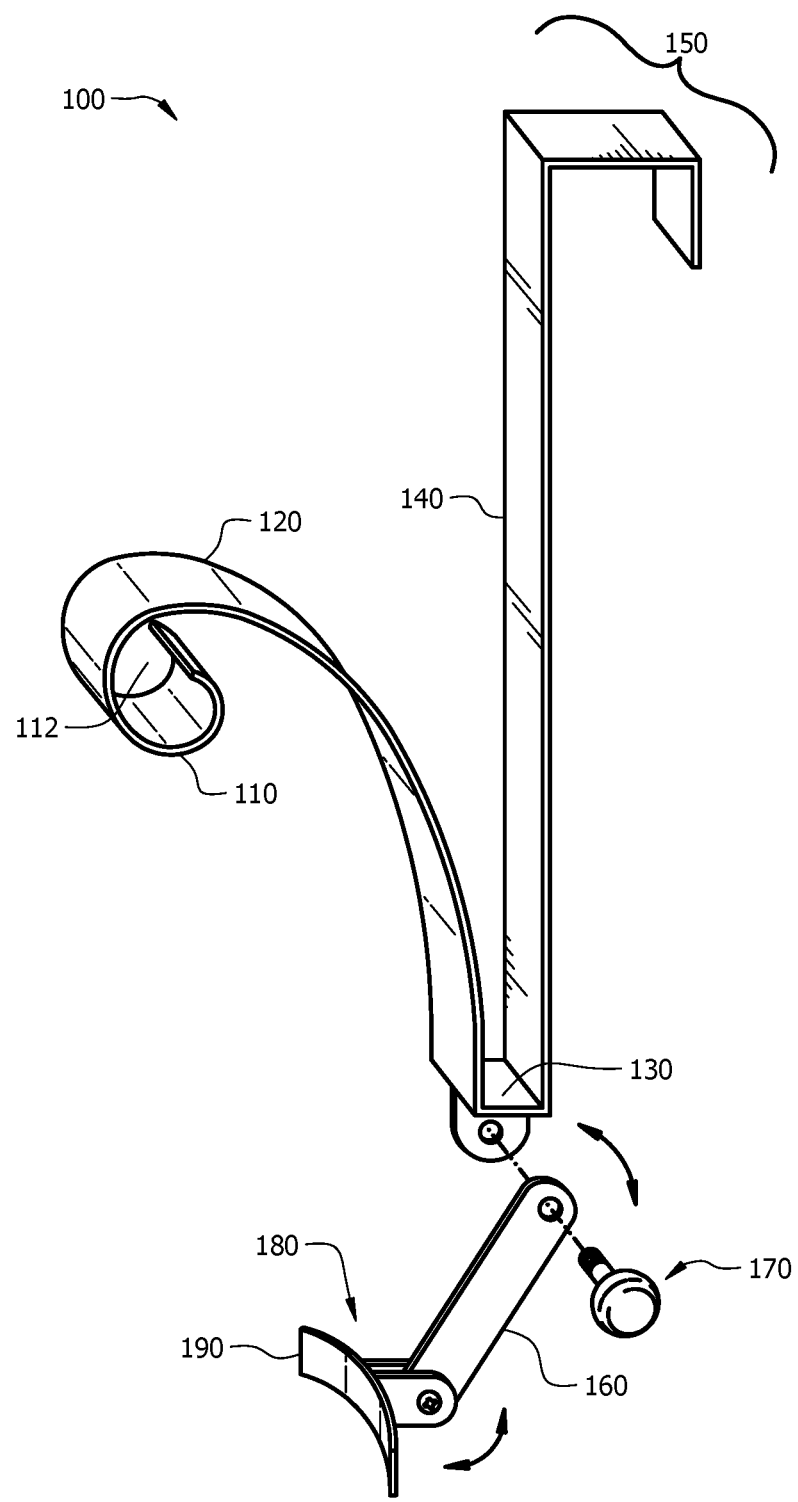
FIG. 1 is a perspective view of a hanging device according to an embodiment of the present disclosure.

FIG. 1 depicts hanger 100 according to an embodiment of the present disclosure. Hanger 100 may be a unitary, solid, and one-piece component that may include hook 110, leg 120, seat 130, bracket 140, and support 150. Hanger 100 may be a combined wreath and lantern hanger, in which wreath (FIG. 3) and lantern (FIGS. 2-3) may both be supported by and hung from hanger 100. Hook 110 may curl or bend downward and may provide a mechanism for hanging a first element (not shown). It should be appreciated that the first element may be a decorative element, lantern 210 (FIGS. 2-3), or any other object without departing from the present disclosure. It should be appreciated that hook 110 may form a portion of a circle and may provide space or gap 112 in the circle that may be provided to insert a portion of an element for hanging the element on hanger 100. It should be appreciated that hanger 100 may provide spacing for a second element (not shown) that may center the first element relative to the second element on hanger 100. It should be appreciated that the second element may be a decorative element, wreath 310 (FIG. 3), or any other object without departing from the present disclosure.

Hanger 100 may be a centering device for the first element and the second element without requiring any tools for attachment and/or adjustment against a first surface. Hanger 100 may include screw holes or require means of being secured to the first surface (not shown). It should be appreciated that screw holes or means of securing hanger 100 to the first surface may not be required without departing from the present disclosure. It should be appreciated that the first surface may include, but is not limited to, interior and exterior doors, walls, fences, gates and additional types of surfaces.

Arm 160 may be detachably or permanently affixed to a bottom portion of hanger 100 and may stabilize the first element and the second element that may be provided in a plurality of sizes and shapes. Arm 160 may stabilize hanger 100, the first element, and the second element and may prevent hanger 100 from damaging a first surface that may be provided behind hanger 100, such as interior and exterior doors, walls, fences, gates, pillars, columns, lampposts, and additional types of surfaces. For example, arm 160 may be positioned to prevent hanger 100 and/or any of lantern 210 (FIGS. 2-3) and wreath 310 (FIG. 3) that may be attached to hanger 100 from rubbing or scraping the first surface and/or a second surface of the first or second element that may be suspended from hanger 100. It should be appreciated that arm 160 may be an adjustable arm that may rotate to a desired angle relative to hanger 100. It should further be appreciated that arm 160 may be fixed and may not rotate.

Flexible strip or pad 190 may attach to arm 160. Flexible strip or pad 190 may be lined on a facing side of flexible strip or pad 190 with replaceable adhesive strip 180. It should be appreciated that the facing side of flexible strip or pad 190 may face a first surface to which hanger 100 may be secured. It should further be appreciated that replaceable adhesive strip 180 may adhere to an available portion of any first or second element that may be suspended from hanger 100. Flexible strip or pad 190 may be connected to arm 160 by incorporating an articulated joint which may allow adhesive strip 180 to be positioned to provide surface area contact with an available portion of the first and/or the second element that may be suspended from hanger 100. It should be appreciated that adhesive strip 180 may be positioned to provide greater surface area contact with the available portion of the first and/or the second element compared to other systems that do not utilize arm 160. Knob 170 may attach arm 160 to seat 130 and may adjust and fix arm 160 at various angles relative to hanger 100. It should be appreciated that knob 170 may be a knurled screw knob in an embodiment of the present disclosure; however, other types of knobs, connectors and handles may adjust and fix arm 160 in a variety of forward and/or rear-facing positions relative to hanger 100 without departing from the present disclosure.

Figure 2:
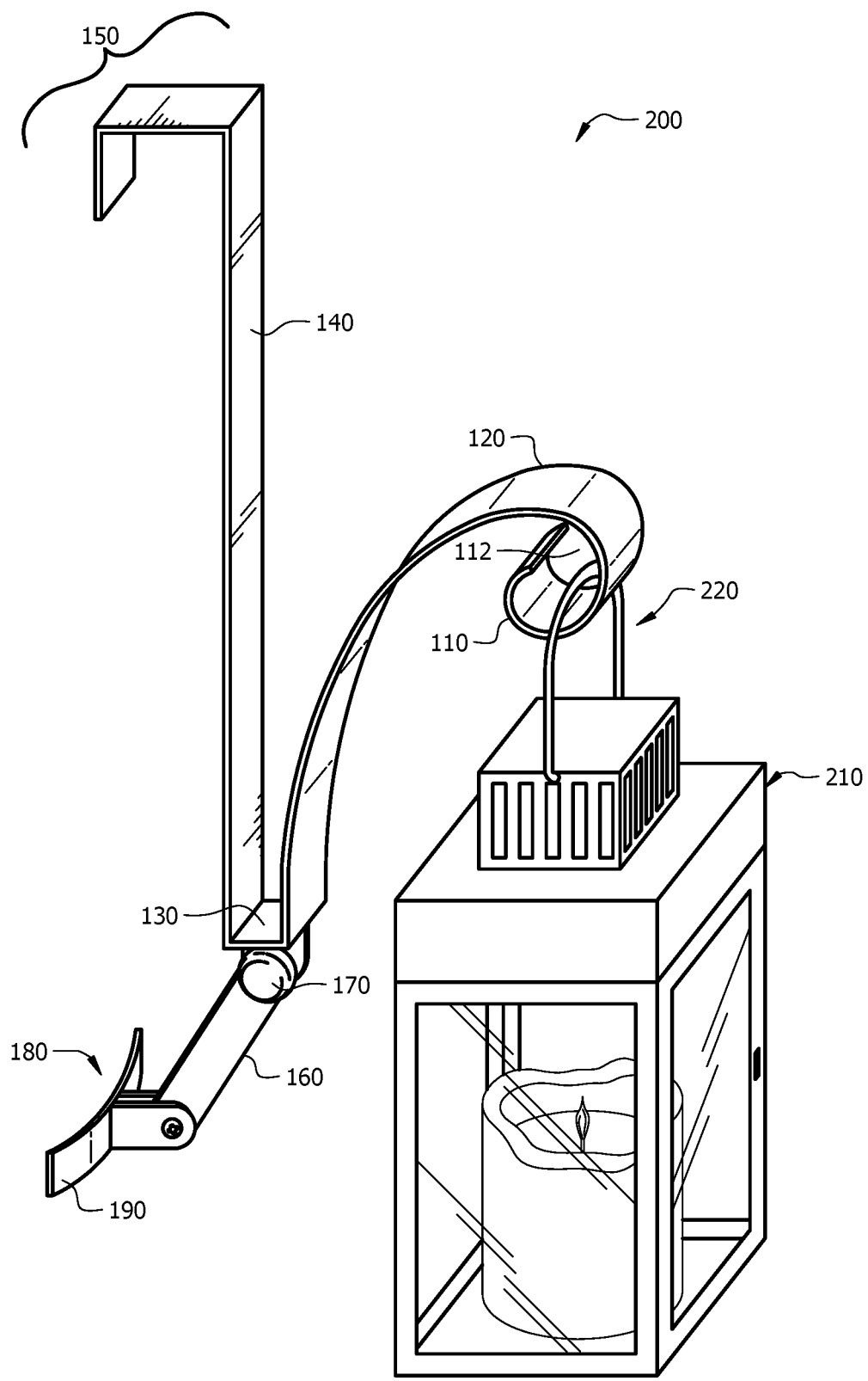
FIG. 2 is a perspective view of a hanging device including one element according to an embodiment of the present disclosure.

FIG. 2 depicts lantern hanger 200 according to an embodiment of the present disclosure. Lantern hanger 200 may provide hanger 100 (FIG. 1) that may include hook 110, leg 120, seat 130, bracket 140, and support 150. Lantern 210 may be secured to lantern hanger 200 by hanging ring portion 220 of lantern 210 from hook 110. It should be appreciated that lantern hanger 200 may support lantern 210 and a second element or another decorative element (not shown) in embodiments of the present disclosure. It should be appreciated that the second element or the another decorative element may be wreath 310 (FIG. 3) in an embodiment of the present disclosure.

Figure 3:
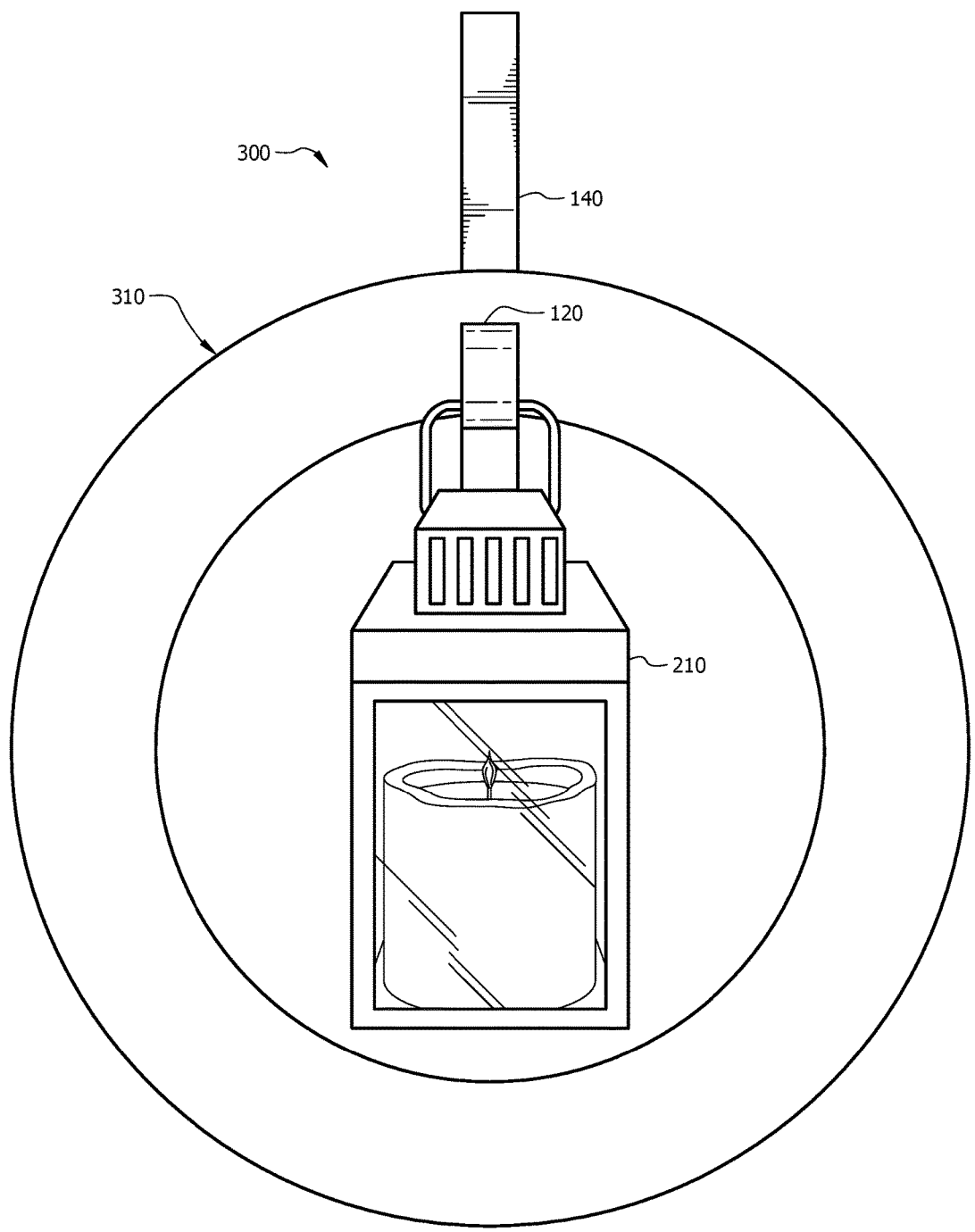
FIG. 3 is a perspective view of a wreath and lantern hanger according to an embodiment of the present disclosure.

FIG. 3 depicts wreath and lantern hanger 300 according to an embodiment of the present disclosure. Wreath and lantern hanger 300 may provide hanger 100 (FIG. 1) that may include leg 120, bracket 140, and support 150. Lantern 210 may be secured to wreath and lantern hanger 300 by hanging from hook 110 (FIGS. 1, 2). Wreath 310 may be secured to wreath and lantern hanger 300 by hanging from seat 130 (FIGS. 1, 2) of hanger 100 in embodiments of the present disclosure.

In embodiments of the present disclosure, arm 160 and flexible strip 190 may be angled to face forward relative to hanger 100 and may secure adjustable adhesive strip 180 to an available portion of the first and/or second element that may be suspended from hanger 100.

In other embodiments of the present disclosure, arm 160 may be angled to face to a rear of hanger 100. It should be appreciated that hanger 100 may be hung from a round post, and arm 160 may be angled toward the rear of hanger 100. Adjustable adhesive strip 180 may wrap onto a first surface which may be in the form of a curved surface of the round post and may prevent hanger 100 from slipping off the round post.

In further embodiments of the present disclosure, arm 160 may be angled to face rearward, and flexible strip or pad 190 may include a self-adhesive foam strip that may be customized to match dimensions of flexible strip or pad 190. The self-adhesive foam strip may prevent hard surfaces of hanger 100 from scraping surfaces of doors from which hanger 100 may be suspended.

In embodiments of the present disclosure, hanger 100 may have any height that may be proportional to a first surface including, but not limited to, an interior door, an exterior door, and/or a vertical surface. The vertical surface may include, but is not limited to walls, gates, pillars, columns, lampposts, and fences. For example, hanger 100 may provide a height that may be approximately ¼ of a height of a door. It should be appreciated that the height of hanger 100 may be more or less than approximately ¼ the height of the door without departing from the present disclosure. Hanger 100 may have a height of approximately 14 inches and a depth of approximately 8 inches. It should be appreciated that seat 130 may have a longest length that may be approximately 1.5 inches. It should be appreciated that support 150 may have a longest length that may be approximately 1.5 inches. It should be appreciated that support 150 may have a shortest length that may be approximately 1 inch. It should be appreciated that leg 120 may have a height that may be approximately 6 inches. It should be appreciated that a distance from hook 110 and bracket 140 may be approximately 8 inches. It should be appreciated that other dimensions and proportions may be utilized for specific decorative applications of hanger 100. It should further be appreciated that hanger 100 may have dimensions that may be more than or less than the dimensions provided herein without departing from the present disclosure.

It should be appreciated that hanger 100 may include a weather-resistant finish. It should be appreciated that hanger 100 may utilized as an over-the-door hanger. It should be appreciated that hanger 100 may be utilized to decorate a front door, a back door, a wall, and/or any additional elements that may be enhanced or decorated with hanger 100. Additional elements may include, but are not limited to, pillars, columns, fences, gates, and lampposts. It should be appreciated that screw holes may be provided in hanger 100 without departing from the present disclosure; however, screw holes may not be required to secure hanger 100 in embodiments of the present disclosure. It should be appreciated that hanger 100 may be constructed from a flat metal material and/or made from any material(s) that may provide strength to support the weight of elements suspended from hanger 100. It should further be appreciated that materials utilized to construct hanger 100 may include, but are not limited to, wood, metal pipes and rods, plastics, reinforced cloths and fibers, and other materials without departing from the present disclosure.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A hanging device, comprising:
    a structurally integral, unitary, solid, one-piece hanger arranged to hang a first element and a second element;
    a downward hook connected to a curved leg of the hanger, the downward hook provided to hang the first element, wherein the curved leg is arranged to face or point outward from a bracket;
    an adjustable arm attached to a bottom portion of the hanger, wherein the adjustable arm is fixed to the hanger, is adjustable to a plurality of positions to stabilize the first element and the second element on the hanger, and prevents the hanger, the first element, and the second element from damaging a first surface behind the hanger when the hanger is hung from a portion of the first surface; and
    a seat arranged defining a base of a longitudinal portion of the bracket, wherein the seat provides a U-shaped receiving area to hold the second element or one or more objects,
    wherein no tools are used for attachment and/or adjustment of the hanger against or to the first surface.

2. The hanging device according to claim 1, wherein the hanger is arranged to position or hang the first element central to the second element.

3. The hanging device according to claim 1, wherein the first element is a lantern and the second element is a wreath.

4. The hanging device according to claim 1, wherein the first element is a lantern and the second element is any decorative object.

5. The hanging device according to claim 1, wherein the second element is a wreath and the first element is any decorative object.

6. The hanging device according to claim 1, wherein the height of the hanger is approximately 14 inches.

7. The hanging device according to claim 1, wherein the first surface is selected from any of an interior door, an exterior door, a wall, a fence, a gate, a pillar, a column, and a lamppost.

8. The hanging device according to claim 1 further comprising:
    a flexible strip or a pad attached to the adjustable arm, wherein the flexible strip or pad is lined with a material that sticks or adheres to a second surface of the first element and the second element suspended from the hanger.

9. The hanging device according to claim 1 further comprising:
    a flexible strip or pad attached to the adjustable arm, wherein the flexible strip or pad is lined with a non-adhesive material that grips the first surface.

10. The hanging device according to claim 1 further comprising:
    a flexible strip or pad attached to the adjustable arm, wherein the flexible strip or pad is lined with a soft material.

11. A hanger to support a wreath and a lantern, the hanger comprising:
    a downward hook provided to hang the lantern;
    a seat providing a U-shaped receiving area to hold and support the wreath; and
    an adjustable arm attached to a bottom portion of the hanger to stabilize the lantern and the wreath on the hanger, wherein the adjustable arm prevents the hanger, the lantern, and the wreath from damaging a first surface behind the hanger when the hanger is hung from a portion of the first surface,
    wherein the hanger is a structurally integral, unitary, solid, one-piece component,
    wherein no tools are used for attachment and/or adjustment of the hanger against or to the first surface, and
    wherein the hanger positions the lantern central to the wreath on the hanger.

12. The hanger according to claim 11, wherein the downward hook is connected to a curved leg, the curved leg arranged to face or point outward and the seat defining a base of a longitudinal portion of the bracket.

13. The hanger according to claim 11, wherein the height of the hanger is approximately 14 inches.

14. The hanger according to claim 11, wherein the hanger is made of a material that provides a weather-resistant finish.

15. The hanger according to claim 11, wherein the first surface is selected from any of an interior door, an exterior door, a wall, a fence, a gate, a pillar, a column, and a lamppost.

16. The hanger according to claim 11 further comprising:
    a flexible strip or pad attached to the adjustable arm, wherein the flexible strip or pad sticks or adheres to a second surface of the first element and the second element suspended from the hanger.

17. The hanger according to claim 11 further comprising:
    a knob attached to the adjustable arm arranged to move the adjustable arm relative to the hanger and position the adjustable arm at different angles toward and away from a second surface of the first element and the second element suspended from the hanger.

18. The hanger according to claim 17, wherein the knob is a knurled screw knob, wherein the knob tightens the adjustable arm on the hanger, and wherein the knob fixedly anchors the adjustable arm in a desired position relative to the hanger.

* * * * *